United States Patent
Anderson et al.

(10) Patent No.: US 8,356,407 B2
(45) Date of Patent: Jan. 22, 2013

(54) METHOD OF RELEASING HIGH TEMPERATURE FILMS AND/OR DEVICES FROM METALLIC SUBSTRATES

(75) Inventors: Nicole Anderson, Midland, MI (US); Dimitris Elias Katsoulis, Midland, MI (US); Bizhong Zhu, Midland, MI (US)

(73) Assignee: Dow Corning Corporation, Midland, MI (US)

( * ) Notice: Subject to any disclaimer, the term of this patent is extended or adjusted under 35 U.S.C. 154(b) by 1096 days.

(21) Appl. No.: 11/991,831

(22) PCT Filed: Aug. 30, 2006

(86) PCT No.: PCT/US2006/033548
§ 371 (c)(1),
(2), (4) Date: Mar. 11, 2008

(87) PCT Pub. No.: WO2007/040870
PCT Pub. Date: Apr. 12, 2007

(65) Prior Publication Data
US 2009/0098393 A1    Apr. 16, 2009

Related U.S. Application Data

(60) Provisional application No. 60/721,708, filed on Sep. 29, 2005.

(51) Int. Cl.
*C08J 5/18* (2006.01)
*B32B 27/00* (2006.01)
*C09D 183/04* (2006.01)
*B29C 41/00* (2006.01)

(52) U.S. Cl. ............ 29/846; 29/829; 29/887; 174/265; 174/260; 174/258

(58) Field of Classification Search .......... 29/829, 29/846, 887; 174/265, 260, 258
See application file for complete search history.

(56) References Cited

U.S. PATENT DOCUMENTS

| | | | |
|---|---|---|---|
| 3,615,272 A | 10/1971 | Collins et al. | |
| 3,649,274 A * | 3/1972 | Older et al. | 430/312 |
| 3,691,136 A | 9/1972 | Serres, Jr. et al. | |
| 3,990,098 A * | 11/1976 | Mastrangelo | 257/43 |
| 4,571,354 A * | 2/1986 | Maxwell | 428/78 |
| 4,999,397 A | 3/1991 | Weiss et al. | |
| 5,010,159 A | 4/1991 | Bank et al. | |
| 5,321,210 A * | 6/1994 | Kimbara et al. | 174/256 |
| 6,048,804 A | 4/2000 | Smith et al. | |
| 6,143,360 A * | 11/2000 | Zhong | 427/244 |
| 6,143,643 A * | 11/2000 | Carter et al. | 438/622 |
| 6,271,273 B1 | 8/2001 | You et al. | |
| 6,301,158 B1 | 10/2001 | Iwahashi | |
| 6,399,210 B1 | 6/2002 | Zhong et al. | |
| 6,475,663 B1 * | 11/2002 | Mohwald et al. | 429/129 |
| 6,488,721 B1 * | 12/2002 | Carlson | 29/623.5 |
| 6,689,421 B2 * | 2/2004 | Patel et al. | 427/245 |
| 6,730,617 B2 | 5/2004 | Carter | |
| 6,875,464 B2 * | 4/2005 | Ruud et al. | 427/142 |
| 6,924,346 B2 | 8/2005 | Boisvert et al. | |
| 7,160,603 B2 * | 1/2007 | Carlson | 428/212 |
| 7,268,201 B2 * | 9/2007 | Adegawa | 528/37 |
| 2002/0090739 A1 * | 7/2002 | Laguitton | 436/518 |
| 2002/0182328 A1 | 12/2002 | Asai et al. | |
| 2004/0012076 A1 | 1/2004 | Hawker et al. | |
| 2004/0163246 A1 | 8/2004 | Nishioka et al. | |
| 2005/0064726 A1 | 3/2005 | Reid et al. | |
| 2005/0069718 A1 * | 3/2005 | Voss-Kehl et al. | 428/447 |
| 2007/0215393 A1 * | 9/2007 | Voss-Kehl et al. | 178/18.01 |
| 2008/0190482 A1 * | 8/2008 | De Jonge | 136/252 |
| 2008/0237615 A1 * | 10/2008 | Lee et al. | 257/89 |
| 2010/0285233 A1 | 11/2010 | Brasseur et al. | |

FOREIGN PATENT DOCUMENTS

| | | |
|---|---|---|
| EP | 0 021 818 | 6/1980 |
| JP | 60-244507 | 12/1985 |
| JP | 3103084 | 5/2004 |
| JP | 2004-255795 | 9/2004 |

OTHER PUBLICATIONS

JP 2001-081192, published Mar. 27, 2001, Applicant Sumitomo Bakelite Co. Ltd.—Abstract.
JP 2002-154126, published May 28, 2002, Applicant Fuji Xerox Co. Ltd.—Abstract.
JP 11-058423, published Mar. 2, 1999, Applicant Nitto Denko Corp.—Abstract.
Cannella, Vencent, et. al., "Flexible Stainless-Steel Substrates," Information Display, Jun. 2005, pp. 24-27.
Kessler, F., et. al., "Monolithically Integrated CU (IN, GA) SE2 Thin-Film Solar Modules on Flexible Polymer and Metal Foils," 19th European Photovoltaic Solar Energy Conference, Jun. 7-11, 2004, Paris, France, p. 1702.
Beernink, K.J., et. al., "High specific power amorphous silicon alloy photovoltaic modules," Conference Record of the IEEE Photovoltaic Specialists Conference (2002), 29th, pp. 998-1001.
Guha, S., et. al., "Amphorphous silicon alloy solar cells for space applications," European Commission, EUR 1998, EUR 18656, 2nd World Conference on Photovoltaic Solar Energy Conversion, 1988 Vo III, pp. 3609-3613.

* cited by examiner

*Primary Examiner* — Derris Banks
*Assistant Examiner* — Kaying Kue
(74) *Attorney, Agent, or Firm* — Larry A. Milco

(57) ABSTRACT

Films and electronic devices can be released from metallic substrates by: (i) applying a coating of a polysilsesquioxane resin to a metallic substrate, (ii) heating the coated metallic substrate to a temperature sufficient to cure the polysilsesquioxane resin, (iii) applying a polymeric film to the cured coating on the metallic substrate, (iv) further heating the coated metallic substrate to a temperature sufficient to cure the polymeric film, (v) optionally fabricating electronic devices on the polymeric film, and (vi) releasing the polymeric film from the metallic substrate.

4 Claims, No Drawings

METHOD OF RELEASING HIGH TEMPERATURE FILMS AND/OR DEVICES FROM METALLIC SUBSTRATES

CROSS REFERENCE TO RELATED APPLICATIONS

This application is a U.S. national stage filing under 35 U.S.C. §371 of PCT Application No. PCT/US06/033548 filed on 30 Aug. 2006, currently pending, which claims the benefit of U.S. Provisional Patent Application No. 60/721,708 filed 29 Sep. 2005 under 35U.S.C. §119 (e). PCT Application No. PCT/US06/0333548 and U.S. Provisional Patent Application No. 60/721,708 are hereby incorporated by reference.

FIELD OF THE INVENTION

This invention is directed to methods to easily release a high temperature polymeric film and/or devices on the film, from a metallic or other substrate. In one particular application, polyimide films are released from a stainless steel foil. Precious metal films such as gold can also be released from the metallic substrate.

BACKGROUND OF THE INVENTION

The fabrication of traditional photovoltaic devices (PV cells), as well as displays and other optoelectronic devices, require numerous high temperature processes. Most of the common such devices are built on glass substrates. Recent advances though on flexible photovoltaic devices include the utilization of metallic substrates such as stainless steel, for the efficient fabrication of flexible solar cells over large areas. These photovoltaic devices are used in numerous terrestrial applications as alternatives to the conventional rigid cells built on glass substrates. Similarly, flexible displays have started to be fabricated on stainless steel substrates. Other technologies such as thin film batteries also can be developed on stainless steel substrates. Metallic substrates such as stainless steel offer numerous advantages. They are commercially available as rolls of various thickness down to 25 μm, and therefore can be processed in a continuous mode that is usually more cost effective than the batch mode. They can retain their dimensional stability with minimum change during the high processing temperatures needed for device fabrication. They can be made to be magnetic, and thus are amenable to continuous processing enabled by magnetic fields. The following publications may be referred to on the uses of stainless steel substrates in optoelectronics, energy and other fields: (i) Cannella, et. al., "Flexible Stainless-Steel Substrates" Information Display June 2005, page 24; (ii) Kessler, et. al., "Monolithically Integrated Cu(IN, Ga)Se$_2$ Thin-Film Solar Modules on Flexible Polymer and Metal Foils", 19$^{th}$ European Photovoltaic Solar Energy Conference, Jun. 7-11, 2004, Paris, France, page 1702: (iii) Baojie, Y., et. al. "High Efficiency Triple-Junction Solar Cells with Hydrogenated Nanocrystalline Silicon Bottom Cell", Conference Record of the IEEE Photovoltaic Specialists Conference (2005), 31st, pages 1456-1459; and (iv) Beernink, et. al., "Ultralight amorphous silicon alloy photovoltaic modules for space applications", Materials Research Society Symposium Proceedings (2002), 730 (Materials for Energy Storage Generation and Transport), Pages 193-198.

Some of the disadvantages of stainless steel are its high specific gravity over that of plastic substrates, its non-transparency, and its low surface roughness unless it is polished by expensive chemical-mechanical polishing (CMP) techniques. For space photovoltaic applications, it is desirable to have as a substrate a high temperature plastic film with low specific gravity, good transparency, and a smooth surface. In display applications, it is desirable to have optical transparency and smooth surfaces. The following publications may be referred to on the use of polyimide substrates for flexible PV devices: (i) Beernink, K. J., et. al., "High specific power amorphous silicon alloy photovoltaic modules", Conference Record of the IEEE Photovoltaic Specialists Conference (2002), 29$^{th}$, pages 998-1001; (ii) Guha, S., et. al., "Amorphous silicon alloy solar cells for space applications.", European Commission, [Report] EUR (1998), (EUR 18656, 2$^{nd}$ World Conference on Photovoltaic Solar Energy Conversion, 1988, Volume III, pages 3609-3613; and (iii) U.S. Pat. No. 6,3001,158 (Oct. 9, 2001) on methods of fabricating thin film solar cells and thin film flexible circuit boards. In addition to their lightweight, common polymeric substrates are amenable to monolithic integration of the devices since they are insulating.

One variation of the current process that has been considered by those in the industry is a photovoltaic cell on a polyimide film that is cast onto a stainless steel foil. The polyimide film with the photovoltaic cell is then peeled off of the stainless steel foil at the end of the process. This strategy offers two advantages. First, the presence of stainless steel as an intimate support of the polymeric substrate has the potential to confine in part the deformations of the polymer during high temperature processing. Also the stainless steel substrate, if magnetic, can allow the use of a magnetic field for continuous roll-to-roll processing. In other words, it allows the use of the same equipment and process that are used for the fabrication of devices on stainless steel substrate alone. Second, the use of the dielectric polyimide film allows the subsequent monolithic integration of the devices in a cost effective manner. A third economic advantage is the potential recycling of the stainless steel.

However this modification has yet to become a viable commercial reality because (i) peeling of polyimide films from an unreleased stainless steel substrate requires a peeling force on the order of 170 g/cm, which will damage fragile photovoltaic devices on top of the film. In addition, the current release coating materials used in the industry such as polytetrafluoroethylene (PTFE), polyethylene adipate (PEA), and silicones of low crosslink density, cannot sustain a temperature of 425° C. that is the highest temperature polyimide films are subjected to during the process. This temperature is mandatory to obtain an acceptable efficiency measured from CIGS (Copper Indium Gallium Diselenide) cells on polyimide film. Similarly, CdTe-based PV cells require temperatures of the same magnitude for their fabrication. Devices that use polycrystalline silicon (e.g. thin film transistors), microcrystalline silicon, and amorphous silicon (PV-cells) require a range of high temperature processing from 280° C. and above. The present invention is a solution to these problems enabling the above mentioned process modifications to become a viable commercial reality for the electronic device manufacturing industry.

BRIEF SUMMARY OF THE INVENTION

The invention is directed to a method comprising:
(i) applying a coating of a polysilsesquioxane resin to a metallic substrate,
(ii) heating the coated metallic substrate to a temperature sufficient to cure the polysilsesquioxane resin,
(iii) applying a polymeric film to the cured coating on the metallic substrate, (iv) further heating the coated metallic substrate to a temperature sufficient to cure the polymeric film, optionally
(v) fabricating electronic devices on the polymeric film, and
(vi) releasing the polymeric film from the metallic substrate.

The invention is also directed to a method comprising:
(i) applying a coating of a polysilsesquioxane resin between an electronic device and a metallic substrate,
(ii) heating the coated metallic substrate to a temperature sufficient to cure the polysilsesquioxane resin, and
(iii) releasing the electronic device from the metallic substrate.

The invention is further directed to a method comprising:
(i) applying a coating of a polysilsesquioxane resin to a metallic substrate,
(ii) heating the coated metallic substrate to a temperature sufficient to cure the polysilsesquioxane resin,
(iii) applying a precious metal film to the cured coating on the metallic substrate, and
(iv) releasing the precious metal film from the metallic substrate.

In each of the methods, the film or the device can be released from the metallic substrate chemically using an acid or a base. In the first method, the polymeric film can also be released from the metallic substrate mechanically by cutting the coated metallic substrate, and then applying a peeling force to the metallic substrate to separate the metallic substrate from the polymeric film. These and other features of the invention will become apparent from a consideration of the detailed description.

DETAILED DESCRIPTION OF THE INVENTION

The invention is directed to a method of releasing a high temperature polymeric film such as a polyimide film and/or devices on the film, from a metallic substrate such as stainless steel foil. In one embodiment, a hydrogen silsesquioxane (HSQ) resin is used as a release coating between the polymeric film and the metallic substrate. The release mechanism is triggered by generating hydrogen by maintaining a small amount of an aqueous base solution at the crack tip. No peeling force is required to release the polymeric film, although a small force can help speed the process. With minimum or no peeling force, the polymeric film readily releases from the metallic substrate. In a second embodiment, a methylphenylsilsesquioxane (MPSQ) resin is used as the release coating between the polymeric film and the metallic substrate. When applied and cured on the metallic substrate, etching with an acid at the interface of the polymeric film and the metallic substrate allowed the polymeric film to be peeled off the metallic substrate. In a third embodiment, a methylphenylsilsesquioxane resin is used as the release coating between the polymeric film and the metallic substrate, and when it is applied and cured on the metallic substrate, mechanical means can be used to enable the polymeric film to be released from both the methylphenylsilsesquioxane resin release coating and the metallic substrate The polysilsesquioxane resin release coatings of the present invention differ from current and previous release coatings in that the polysilsesquioxane resins are capable of sustaining temperatures required for amorphous silicon (α-Si), microcrystalline silicon (μ-Si), Cadmium telluride (CdTe), and CIGS, processing on polymeric films such as polyimide films. They are also capable of effecting release with little or no peeling force. This minimizes the danger of mechanically damaging delicate devices such as photovoltaic cells supported on polymeric substrates.

The Polysilsesquioxane Resin

The polysilsesquioxane resin used as a release coating can be any of the resins known in the art where at least 50 percent of the silicon atoms have a hydrogen substitution and as such can be homopolymers or copolymers. The structure of the resin is not specifically limited however hydrogen silsesquioxane resins are preferred. The resins may contain end groups such as hydroxyl groups, triorganosiloxy groups, diorganohydrogensiloxy groups, trialkoxy groups, dialkoxy groups, and others groups. Although not represented by this structure, these resins may also contain up to about 50 percent of silicon atoms which have either 0 or 2 hydrogen atoms attached thereto, or a small number of SiC groups such as $CH_3SiO_{3/2}$ or $HCH_3SiO_{2/2}$ groups. Useful resins may be exemplified by, but are not limited to:

$(HSiO_{3/2})_n$, $(HSiO_{3/2})_x(R^1SiO_{3/2})_y$, $(HSiO_{3/2})_x(R^1R^2SiO)_y$, $(HSiO_{3/2})_x(R^1R^2SiO)_y(SiO_2)_z$, and $(HSiO_{3/2})_x(H_2SiO)_y$ In the formulas, $R^1$ is a substituent which is not removed by heating at temperatures up to about 600° C. $R^1$ is exemplified by, but not limited to, alkyl groups such as methyl, ethyl, and propyl; aryl groups such as phenyl; unsaturated hydrocarbon groups such as vinyl and allyl; and substituted groups thereof including aralkyl groups such as phenylethyl; alkaryl groups such as tolyl; and halohydrocarbon groups such as chloromethyl. $R^2$ can be $R^1$ or hydrogen, n is greater than or equal to 8, the mole fractions, x, y, and z total one in each of the above copolymers, and x is at least 0.5 of the sum of x, y, and z. A preferred weight average molecular weight for the resin is between 1,000-150,000, with a preferred range between 20,000-100,000.

The above resins and methods for their production are known in the art. For example, U.S. Pat. No. 3,615,272 (Oct. 26, 1971) describes the production of a nearly fully condensed hydridosiloxane resin which may contain up to 100-300 ppm silanol, by a process of hydrolyzing trichlorosilane in a benzene sulfonic acid hydrate hydrolysis medium, and then washing the resultant resin with water or aqueous sulfuric acid. Similarly, U.S. Pat. No. 5,010,159 (Apr. 23, 1991) describes an alternative method of hydrolyzing hydridosilanes in an arylsulfonic acid hydrate hydrolysis medium to form a resin which is then contacted with a neutralizing agent. Other resins can be used herein such as (i) those described in U.S. Pat. No. 4,999,397 (Mar. 12, 1991); (ii) those produced by hydrolyzing an alkoxy or acyloxy silane in an acidic or alcoholic hydrolysis medium; (iii) the alkoxyhydridosiloxane resins described in U.S. Pat. No. 6,399,210 (Jun. 4, 2002); and (iv) the phenyl containing resins described in U.S. Pat. No. 6,924,346 (Aug. 2, 2005). The alkoxyhydridosiloxane resin in (iii) consists of $ROSiO_{3/2}$ siloxane units and $HSiO_{3/2}$ siloxane units, wherein R is an alkyl group having 10-28 carbon atoms, wherein the alkoxyhydridosiloxane resin contains an average from 5-40 mole percent silicon bonded alkoxy groups, and wherein the alkoxyhydridosiloxane resin contains an average of at least 45 mole percent silicon bonded hydrogen atoms. The resin in (iv) consists of 5-50 mole percent of $(PhSiO)_{(3-x)/2}(OH)_x$ units and 50-95 mole percent of $(HSiO_{(3-x)/2}(OH)_x$ units, where Ph is a phenyl group and x has a value from 1 to 2.

The Acid and Base Release Agents

A release agent is used to enable removal of the polymeric film from the metallic substrate. The release agent can be an acid or base. Generally, it is an aqueous solution containing common acids such as hydrochloric acid, sulfuric acid, or nitric acid; or solutions containing common bases such as sodium hydroxide, calcium hydroxide, ammonium hydroxide, or potassium hydroxide. Organic acids and bases can also function as release agents, either used by themselves in a solvent, or in mixtures with the inorganic counterparts, when the solubility parameters allow it. Some examples of organic acids are acetic acid, formic acid, and trifluoro acetic acid. Some examples of organic bases are tetramethyl ammonium hydroxide, tetraethyl ammonium tetrabutyl ammonium hydroxide, and primary, secondary, and tertiary amines. These examples are not exhaustive however.

The Solvent

Polysilsesquioxane resins are generally manufactured and commercially available and applied as solvent solutions containing the resins. Many organic or silicone solvents are used. The solvent may be present generally in amounts varying from 10-75 percent by weight, based on weight of the solvent and the resin. Some organic solvents include saturated aliphatics such as n-pentane, hexane, n-heptane, and isooctane; cycloaliphatics such as cyclopentane and cyclohexane; aromatics such as benzene, toluene, xylene, mesitylene; ethers such as tetrahydrofuran, dioxane, ethylene glycol dietheyl ether, ethylene glycol dimethyl ether; ketones such as methyl isobutyl ketone (MIBK) and cyclohexanone; halogen substituted alkanes such as trichloroethane; halogenated aromatics such as bromobenzene and chlorobenzene; and esters such as isobutyl isobutyrate and propyl propronate. Useful silicone solvents include cyclic siloxanes such as octamethylcyclotetrasiloxane, and decamethylcyclopentasiloxane. A single solvent may be used or a mixture of solvents may be used.

Application

Specific methods for applying the polysilsesquioxane resin to the metallic substrate include spin-coating, dip-coating, spray-coating, flow-coating, and screen-printing. The preferred method for applying the resin to the metallic substrate is spin-coating. A thin, generally less than 2.5 micrometer (μm) coating, is applied to the metallic substrate. Preferably, the coating has a thickness of 0.3 to 1.2 micrometer.

After being applied, the solvent can be removed from the metallic substrate. Any suitable means for removal may be used such as drying, application of a vacuum, and/or the application of heat generated by passing a coated substrate over one or more hot plates. When spin coating is used, additional drying is minimized since the spinning drives off most of the solvent.

Following application to the metallic substrate, the polysilsesquioxane resin coated substrate is heated to a suitable temperature to cure the resin. Typically, the coated metallic substrate is heated to a temperature in the range of 100-600° C. to cure the resin, preferably 100-450° C.

The atmosphere used during the curing of the resin is not limited. Some useful atmospheres include oxygen containing atmospheres such as air, and inert atmospheres such as nitrogen and argon. By inert it is meant that the environment contains less than 50 ppm, preferably less than 10 ppm of oxygen. The pressure at which the curing is carried out is not critical. The curing is typically carried out at atmospheric pressure, however, sub-atmospheric or super-atmospheric pressures may also be used.

Any method of heating may be used to cure the resin. For example, the metallic substrate may be placed in a quartz tube furnace, a convection oven, a rapid thermal processing device, or allowed to stand on a hot plate. Furnaces are commonly used in the industry to produce cured resin films on substrates.

While the invention is described in the following examples using polyimide films and stainless steel foils, the methods herein are applicable to other polymeric films and metallic substrates. The method can also be used for polymeric films intended as supports for electronic devices other than photovoltaic cells, such as batteries and electronic displays. Additionally, in carrying out the method, the polymeric film supporting a device can be applied to the resin release coating, or only the device can be directly applied to the resin release coating.

EXAMPLES

The following examples are included to demonstrate the preferred embodiments of the invention. It should be appreciated by those of skill in the art that the techniques disclosed in the examples which follow represent techniques discovered by the inventor to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result, without departing from the spirit and scope of the invention. All percentages are in weight percent unless otherwise indicated. In addition, unless otherwise indicated, the polysilsesquioxane resins used in the Examples were commercially available products of the Dow Corning Corporation, Midland, Mich.

Example 1

Preparation of Hydrogen Silsesquioxane Resin Coated Stainless Steel Foil

A 25 micrometer thick stainless steel foil was cleaned with isopropyl alcohol and then with acetone. A solid hydrogen silsesquioxane (HSQ) resin was dissolved in methyl isobutyl ketone (MIBK) to provide a 20 percent by weight solution. The solution was used to coat the stainless steel foil by spin coating. The spin coating conditions were 1,000 rpm, 30 seconds, uncontrolled acceleration. The coated stainless steel foil was stored at room temperature for 1-24 hours and then moved to an air circulating oven to cure. The curing conditions were 3° C. per minute to 100° C., 100° C. for 30 minutes, 3° C. per minute to 150° C., 150° C. for 30 minutes, 3° C. per minute to 200° C., and 200° C. for 60 minutes.

Example 2

Preparation of Methylphenylsilsesquioxane Resin Coated Stainless Steel Foil

A methylphenylsilsesquioxane (MPSQ) resin was used in this example as a xylene solution containing 60 percent by weight of the resin. The resin solution was further diluted with MIBK to provide a solution containing 18 percent by weight of the resin. The stainless steel foil was coated with the resin solution under the same coating and curing conditions used in Example 1.

Example 3

Preparation of Stainless Steel Foil Coated with a Blend of Resins 3 gram of the methylphenylsilsesquioxane resin solution used in Example 2, and 3 gram of a solid hydrogen silsesquioxane resin as a MIBK solution containing 60 percent by weight of the resin were mixed, and the 6 gram of MIBK was added. The mixture was applied to a stainless steel foil under the same coating and curing conditions used in Example 1.

Example 4

Preparation of Stainless Steel Foil Coated with a Blend of Resins

Two gram of a methylphenylsilsesquioxane flaked resin was dissolved in 4 gram of MIBK. Two gram of a solid hydrogen silsesquioxane resin was dissolved in 4 gram of MIBK, and mixed in thoroughly with the flaked resin MIBK solution. The mixture was applied to a stainless steel foil under the same coating and curing conditions used in Example 1.

Example 5

Preparation of a Flake Resin Coated Stainless Steel Foil

A methylphenylsilsesquioxane flaked resin was dissolved in MIBK to provide a solution containing 20 percent by weight of the flaked resin. The resin solution was filtered through a 0.2 micrometer filter, and spin coated onto a 4×4 inch stainless steel foil. The coated stainless steel foil was stored at room temperature for 1-24 hours, and then moved to an infrared oven to cure. The infrared oven had four heating zones open to air, each having a length of 1.5 feet. The temperature settings for these zones from the entrance of the sample to the exit were 140° C., 180° C., 200° C., and 240° C., respectively. The speed of the conveying belt was controlled so that the residence time was approximately 40 minutes. The coating thickness was approximately 1 micrometer.

Example 6

Preparation of Stainless Steel Foil Coated with a Blend of Resins

A soluble methylsilsesquioxane resin was prepared by hydrolyzing methyltrichlorosilane, condensing the hydrolyzate, and then vacuum drying the resin. 0.5 gram of the methylsilsesquioxane resin, and 2 gram of a solid hydrogen silsesquioxane resin dissolved in MIBK to provide a 60 percent by weight solution, were mixed and then dissolved in 6 gram of MIBK. The blended silsesquioxane resin solution was used to coat stainless steel foil. The coating and curing conditions were used in Example 1.

Example 7

Preparation of Polyimide Film on HSQ Resin Coated Stainless Steel Foil

A polyimide precursor commercially available from HD Microsystems, Parlin, N.J., under their trade name PYRALIN, was coated onto the hydrogen silsesquioxane resin coated stainless steel foil prepared in Example 1. The polyimide resin precursor was applied by a pipette and spread by a drawdown number 16 coating bar. The coated stainless steel foil was baked on a hot plate at 150-160° C. for 20 minutes, and cured in an air circulating oven at 300° C. for one hour.

Example 8

Preparation of Polyimide Film on MPSQ Resin Coated Stainless Steel Foil

The polyimide precursor used in Example 7 was applied to the methylphenylsilsesquioxane resin coated stainless steel foil prepared in Example 2 in a similar fashion and then cured under the same conditions used in Example 7.

Example 9

Preparation of Polyimide Film on Resin Blend Coated Stainless Steel Foil

The same polyimide precursor used in Example 7 was applied to the stainless steel foil prepared in Example 3 in a similar fashion and cured under the same conditions used in Example 7. The blend contained a methylphenylsilsesquioxane resin and a solid hydrogen silsesquioxane resin.

Example 10

Preparation of Polyimide Film on Resin Blend Coated Stainless Steel Foil

The same polyimide precursor used in Example 7 was applied to the stainless steel foil prepared in Example 4 in a similar fashion and cured under the same conditions used in Example 7. The blend contained a flaked methylphenylsilsesquioxane resin and a solid hydrogen silsesquioxane resin.

Example 11

Preparation of Polyimide Film Flaked MPSQ Coated Stainless Steel Foil

The same polyimide precursor used in Example 7 was applied to the stainless steel foil prepared in Example 5 in a similar fashion and cured under the same conditions used in Example 7.

Example 12

Preparation of Polyimide Film on Resin Blend Coated Stainless Steel Foil

The same polyimide precursor used in Example 7 was applied to the stainless steel foil prepared in Example 6 in a similar fashion and cured under the same conditions used in Example 7. The blend contained a methylsilsesquioxane resin and a solid hydrogen silsesquioxane resin.

Example 13

Preparation of Polyimide Film on Uncoated Stainless Steel Foil

A polyimide films was prepared on the uncoated stainless steel foil using the process described in Examples 7-12 for comparison.

Example 14

Preparation of Gold Film on HSQ Coated Stainless Steel Foil

A gold film was prepared by placing the coated stainless steel foil used in Example 1 in a sputtering chamber, and plasma sputtering gold onto it from a gold target. Time and conditions of sputtering were adjusted so that a 0.15 micrometer thick gold film was formed on top of the hydrogen silsesquioxane resin coated stainless steel foil.

Example 15

Process to Release Coatings using Aqueous HCl

The polyimide films prepared in Examples 7-13 were immersed in a 5 or 10 percent by weight HCl aqueous solution. The time for the polyimide films to the lifted off the stainless steel foil without applying external forces was recorded. The results are shown in Table 1. The release mechanism in the case of an acid is that the acid release agent etches the interface between the polysilsesquioxane resin coating and the polyimide film. This allows the polyimide film to be released from the stainless steel foil. The polysilsesquioxane resin coating remains on the surface of the polyimide film.

Example 16

Process to Release Coatings Using Aqueous HCl

The polyimide films prepared in Examples 7-13 were immersed in a 20 percent by weight HCl aqueous solution. The time for the polyimide films to the lifted off the stainless steel foil without applying external forces was recorded. The results are shown in Table 1. The release mechanism is the same as noted in Example 15.

Example 17

Process to Release Coatings Using Aqueous $H_2SO_4$

The polyimide films prepared in Examples 7-13 were immersed in a 7.7 volume percent $H_2SO_4$ aqueous solution. The time for the polyimide films to the lifted off the stainless steel foil without applying external forces was recorded. The results are shown in Table 1. The release mechanism is the same as noted in Example 15.

Example 18

Process to Release Coatings Using Aqueous $HNO_3$

The polyimide films prepared in Examples 7-13 were immersed in a 17.4 volume percent $HNO_3$ aqueous solution. The time for the polyimide films to the lifted off the stainless steel foil without applying external forces was recorded. The results are shown in Table 1. The release mechanism is the same as noted in Example 15.

Example 19

Process to Release Coatings Using NaOH

The polyimide films and the gold film prepared in Examples 7-14 were immersed in a 10 percent by weight aqueous NaOH solution. The time for the polyimide films to be lifted off the stainless steel foil without applying external forces was recorded. The results are shown in Table 1.

In an alternate process for obtaining release between the polyimide film and the stainless steel foil, the release was initiated by mechanically rubbing a cross-sectional cut of the stack with a small amount of a 10 percent by weight aqueous NaOH solution so as to introduce it into the wedge area. The polyimide film was peeled off with the aqueous NaOH solution maintained at the tip of the wedge area between the polyimide film and the stainless steel foil. The results are shown in Table 1.

The release mechanism in the case of a base is a sacrificial release. Thus, the base reacts with the hydrogen silsesquioxane resin to generate hydrogen gas. The hydrogen gas functions to push the polyimide film off the stainless steel foil. The polysilsesquioxane resin becomes a powder residue that can easily be washed off the polyimide film and the stainless steel foil. The polysilsesquioxane resin coating therefore is a sacrificial coating between the polyimide film and the stainless steel foil.

Example 20

Process to Release Coatings Using Only Mechanical Force

No release agent was used in this example. The polyimide coated stainless steel foils prepared in Examples 7-13 were freshly cut with a pair of scissors. Separation of the polyimide film from the coated stainless steel foil was initiated by rubbing perpendicularly to the film at the cross-sectional cut. A peeling force was then applied in an effort to release the polyimide film from the stainless steel foil. In this embodiment, the polyimide film is peeled off the polysilsesquioxane resin coating that remains on the stainless steel foil. The results are shown in Table 1.

In Table 1, n/a indicates that the Example was not performed. The asterisks ** indicate that the polyimide film was of poor quality or that the acid and base release agents degraded the polyimide film excessively, and therefore the procedure was not useful.

TABLE 1

Results of Release Behavior of Polyimide Films or a Gold Film from Coated and Uncoated Stainless Steel Foils

| Release Process | Polyimide Film to be Released | | | | | | | Gold Film to be Released |
|---|---|---|---|---|---|---|---|---|
| | Coating Ex. 1 | Coating Ex. 2 | Coating Ex. 3 | Coating Ex. 4 | Coating Example 5 | Coating Example 6 | Coating Ex. 13 | Coating Example 14 |
| Ex. 15 HCl | n/a | ** | ** | n/a | <1 h for 1 × 0.5 inch, clean lift off | ** | No release until foil dissolves | n/a |
| Ex. 16 HCl | n/a | ** | ** | n/a | 24 min for 1 × 0.5 inch, clean lift off | ** | No release until foil dissolves | n/a |
| Ex. 17 $H_2SO_4$ | n/a | ** | ** | n/a | No release within 24 hours | ** | No release within 24 hours | n/a |
| Ex. 18 $HNO_3$ | n/a | ** | ** | n/a | No release within 24 hours | ** | No release within 24 hours | n/a |

TABLE 1-continued

Results of Release Behavior of Polyimide Films or a Gold Film from Coated and Uncoated Stainless Steel Foils

| Release Process | Polyimide Film to be Released | | | | | | | | Gold Film to be Released |
|---|---|---|---|---|---|---|---|---|---|
| | Coating Ex. 1 | Coating Ex. 2 | Coating Ex. 3 | Coating Ex. 4 | Coating Example 5 | Coating Example 6 | Coating Ex. 13 | Coating Example 14 | |
| Ex. 19 NaOH | Edge delaminates in <1 minute. Then it peels off | ** | ** | Edge delaminates in <5 minutes. Then it peels off | Edge delaminates. Then it peels off | ** | No release, long immersion dissolves foil | <1 hour for 1 × 0.5 inch, clean lift off, no peeling needed | |
| Ex. 20 Mechanical | No release | ** | ** | n/a | Peels off easily, reusable up to 4 times | ** | No release | n/a | |

Other variations may be made in compounds, compositions, and methods described herein without departing from the essential features of the invention. The embodiments of the invention specifically illustrated herein are exemplary only and not intended as limitations on their scope except as defined in the appended claims.

That which is claimed is:

1. A method comprising:
   (i) applying a coating of a polysilsesquioxane resin to a metallic substrate,
   (ii) heating the coated metallic substrate to a temperature sufficient to cure the polysilsesquioxane resin,
   (iii) applying a polymeric film to the cured coating on the metallic substrate,
   (iv) further heating the coated metallic substrate to a temperature sufficient to cure the polymeric film,
   (v) optionally fabricating electronic devices on the polymeric film, and
   (vi) releasing the polymeric film from the metallic substrate, in which the polymeric film is released from the metallic substrate by directly contacting the coated metallic substrate with a base, and removing the metallic substrate from the polymeric film.

2. The method according to claim 1 in which the polysilsesquioxane resin has the formula:

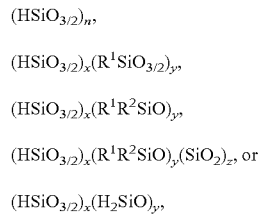

where $R^1$ is an alkyl group, an aryl group, an unsaturated hydrocarbon group, an aralkyl group, an alkaryl group, or a halohydrocarbon group; $R^2$ is the same as $R^1$ or hydrogen; n is greater than or equal to 8; the mole fractions x, y, and z total one in each formula; and x is at least 0.5 of the sum of x, y, and z.

3. The method according to claim 1 in which the electronic device is a photovoltaic cell, a battery, or an electronic display.

4. An electronic device prepared by the method according to claim 1.

* * * * *